UNITED STATES PATENT OFFICE.

EDGAR M. STEVENS, OF BOSTON, MASSACHUSETTS, ASSIGNOR, BY MESNE ASSIGNMENTS, TO UNION RUBBER ENAMEL COMPANY, OF NASHUA, NEW HAMPSHIRE.

ENAMELED RUBBER CLOTH.

SPECIFICATION forming part of Letters Patent No. 233,296, dated October 12, 1880.

Application filed April 12, 1880. (Specimen.)

*To all whom it may concern:*

Be it known that I, EDGAR M. STEVENS, of Boston, in the county of Suffolk and State of Massachusetts, have invented an Improvement in Enameled Rubber Cloth, of which the following is a specification.

I obtained Letters Patent No. 75,807, dated March 24, 1868, for improvement in the manufacture of enameled cloth, in which rubber was used in combination with linseed-oil and other materials. Since the date of that patent I have made considerable improvements in the manufacture, and the following specification describes the nature of the said improvements.

I have discovered that it is desirable in heavy goods, for the purpose of giving the greatest possible tenacity and toughness to the surface compound, that it shall contain about one-third, by weight, of plastic rubber and about one-third, by weight, of boiled linseed-oil, and that the remaining one-third, by weight, should consist of solid substances, added for the purpose of giving body and color to the compound. But while it is desirable that this considerable quantity of rubber should be used, I have also discovered that ordinary mechanical means are not sufficient to make a homogeneous surfacing compound where so large a proportion of rubber is employed, or even where much less is used.

The surfacing compound should be of about the consistency of ordinary paint when applied, and should be homogeneous. In order to produce this result I take the quantity of rubber and oil required, equal parts, by weight, of each. The rubber should be plastic rubber of good quality—such, for instance, as Para gum dissolved in naphtha or other suitable solvent, and of about the consistency of ordinary rubber cement, and the linseed-oil should be good oil, and either boiled or raw. It is, of course, desirable for economy to use raw oil. This oil I heat in the ordinary manner of making varnish, adding to it as it heats up the desired quantity of the plastic rubber, which is gradually incorporated as copal is incorporated with oil in making varnish.

I do not think it well to allow this mixture to boil, but only to simmer in the manner in which oil for making varnish is simmered— that is, until small bubbles break on the surface and the whole surface is silvery, but not eruptive—and the heat should not be sufficient to create foaming in the vessel. While the mixture is heating up to this degree of temperature, or after it is so heated, I add the requisite quantity—namely, an amount about equal in weight to that of the boiled linseed-oil or of the rubber of the ingredients which I may select for the purpose of giving color or body, or both. For a black-surfacing compound this material would be lamp-black; for a blue-surfacing compound the material would be, preferably, Prussian blue or cobalt. Other pigments will give other colors. I have found by experience that the iron pigments have a tendency to make the compound brittle, and should therefore be avoided if the material is to be put in a place where it is liable to be bent much. The umbers, ochers, and colors derived from the oxidation of iron pyrites are included in this category. Chrome colors do not have this effect to any such degree as those which have been enumerated. Fine meal, particularly fine rye-meal, may be used for body, and fine sawdust or the dust of infusorial earth or flour, the oil and rubber incorporating well with these porous bodies. A light-colored body is preferable when the tint is to be anything but black.

The material, thus prepared by simmering together the plastic rubber, linseed-oil, and body and coloring-matters, should be of about the consistency of ordinary house-paint when cold. If it is less thick than this it can be thickened by adding more of the coloring-matter or body, or both, and if it is thicker than this it can be thinned by the addition of naphtha. This material is spread with a brush or palette-knife upon the cloth in the usual way.

The cloth to be selected should be of rather slack-twisted thread, and the surfacing compound should be brushed or rubbed on it and into it thoroughly and carefully in the usual way, either cold or but slightly warm. This cloth thus prepared is then passed through steam-heated calenders, which gives it the proper surface and smoothness. In case the black cloth is to bear a very high polish it is then varnished with the well-known rubber varnish used for finishing india-rubber shoes and the like.

The improvement in this process, it will be observed, consists, mainly, in the combination of boiled linseed-oil and plastic rubber by aid of a temperature just below the boiling-point of the oil.

I therefore claim as my invention and desire to secure by Letters Patent of the United States—

1. A surfacing compound for enameled rubber cloth consisting of substantially equal parts of boiled linseed-oil and plastic rubber and suitable body and coloring-matter, combined together by heat, substantially as described.

2. Enameled rubber cloth coated with a surfacing containing substantially equal parts of boiled linseed-oil, plastic rubber, and suitable body and coloring-matter, combined together by heat before applying to the cloth, and hot-calendered after application, substantially as described.

3. A surface compound consisting, mainly, of dissolved india-rubber and linseed-oil, incorporated together by simmering at or just below the boiling-point of the oil, substantially as and for the purpose described.

EDGAR M. STEVENS.

Witnesses:
F. F. RAYMOND, 2d,
F. F. McCLINTOCK.